US012659542B2

(12) United States Patent
Kulas

(10) Patent No.: US 12,659,542 B2
(45) Date of Patent: *Jun. 16, 2026

(54) MULTIPLE VIDEO TAGS IN A VIDEO SCENE

(71) Applicant: Gula Consulting Limited Liability Company, Dover, DE (US)

(72) Inventor: Charles J. Kulas, San Francisco, CA (US)

(73) Assignee: Gula Consulting Limitied Liability Company, Dover, DE (US)

( * ) Notice: Subject to any disclaimer, the term of this patent is extended or adjusted under 35 U.S.C. 154(b) by 144 days.

This patent is subject to a terminal disclaimer.

(21) Appl. No.: 18/641,916

(22) Filed: Apr. 22, 2024

(65) Prior Publication Data

US 2025/0392776 A1 Dec. 25, 2025

Related U.S. Application Data

(63) Continuation of application No. 18/094,730, filed on Jan. 9, 2023, now Pat. No. 11,997,345, which is a
(Continued)

(51) Int. Cl.
*H04N 21/431* (2011.01)
*H04N 7/01* (2006.01)
(Continued)

(52) U.S. Cl.
CPC ..... *H04N 21/4316* (2013.01); *H04N 21/4312* (2013.01); *H04N 21/4314* (2013.01);
(Continued)

(58) Field of Classification Search
None
See application file for complete search history.

(56) References Cited

U.S. PATENT DOCUMENTS 5,680,532 A 10/1997 Amakawa et al.
5,929,849 A * 7/1999 Kikinis .............. H04N 21/4381
348/E7.071
(Continued)

FOREIGN PATENT DOCUMENTS

WO WO-2007115224 A2 * 10/2007 ........... G01S 13/878
WO WO-2007130472 A2 * 11/2007 ......... H04N 21/8455

OTHER PUBLICATIONS

Third party, Alleged invalidity claim chart for U.S. Pat. No. 10,187,688 (recv'd Nov. 2022).
(Continued)

*Primary Examiner* — Ricky Chin

(57) ABSTRACT

A method causes a display device to simultaneously display (1) a video scene including a plurality of items depicted in the video scene; (2) a first tag in a first position in the video scene; and (3) a second tag in a second position, distinct from the first position, in the video scene. The first tag is associated with one of the items in the video scene. The second tag is associated with one of the items in the video scene. The second tag appears distinct and separated away from its associated item in the video scene. The second tag includes text information describing its associated item in the video scene.

16 Claims, 9 Drawing Sheets

Related U.S. Application Data continuation of application No. 17/229,240, filed on Apr. 13, 2021, now Pat. No. 11,678,008, which is a continuation of application No. 16/799,575, filed on Feb. 24, 2020, now Pat. No. 10,979,760, which is a continuation of application No. 16/253,597, filed on Jan. 22, 2019, now Pat. No. 10,575,044, which is a continuation of application No. 15/907,095, filed on Feb. 27, 2018, now Pat. No. 10,187,688, which is a continuation of application No. 15/269,701, filed on Sep. 19, 2016, now Pat. No. 9,906,829, which is a continuation of application No. 12/172,185, filed on Jul. 11, 2008, now Pat. No. 9,451,195.

(60)  Provisional application No. 60/949,505, filed on Jul. 12, 2007.

(51)  Int. Cl.
| | |
|---|---|
| *H04N 21/4402* | (2011.01) |
| *H04N 21/462* | (2011.01) |
| *H04N 21/47* | (2011.01) |
| *H04N 21/4722* | (2011.01) |
| *H04N 21/4782* | (2011.01) |

(52)  U.S. Cl.
CPC . *H04N 21/440272* (2013.01); *H04N 21/4622* (2013.01); *H04N 21/47* (2013.01); *H04N 21/4722* (2013.01); *H04N 21/4782* (2013.01); *H04N 7/0122* (2013.01)

(56)  References Cited

U.S. PATENT DOCUMENTS

| | | | | |
|---|---|---|---|---|
| 5,987,509 | A * | 11/1999 | Portuesi | H04N 21/4722 725/113 |
| 6,493,872 | B1 | 12/2002 | Rangan et al. | |
| 6,546,405 | B2 | 4/2003 | Gupta et al. | |
| 6,580,870 | B1 * | 6/2003 | Kanazawa | H04N 21/4316 386/244 |
| 7,027,101 | B1 | 4/2006 | Sloo et al. | |
| 7,133,837 | B1 | 11/2006 | Barnes, Jr. | |
| 7,224,401 | B2 | 5/2007 | Ackley et al. | |
| 7,343,561 | B1 | 3/2008 | Stochosky et al. | |
| 7,487,112 | B2 | 2/2009 | Barnes, Jr. | |
| 7,796,155 | B1 * | 9/2010 | Neely, III | G06V 20/52 348/157 |
| 7,933,809 | B2 * | 4/2011 | Abraham | H04N 21/8126 705/26.1 |
| 8,073,830 | B2 * | 12/2011 | Fontes | G06F 16/951 707/706 |
| 8,285,121 | B2 * | 10/2012 | Kulas | H04N 21/4788 386/326 |
| 8,412,021 | B2 * | 4/2013 | Kulas | H04N 9/8227 386/245 |
| 8,640,030 | B2 | 1/2014 | Kulas | |
| 8,656,282 | B2 | 2/2014 | Kulas | |
| 9,008,491 | B2 * | 4/2015 | Kulas | H04N 21/47205 386/239 |
| 9,451,195 | B2 * | 9/2016 | Kulas | H04N 21/4622 |
| 9,609,260 | B2 * | 3/2017 | Kulas | G06Q 30/06 |
| 9,648,296 | B2 | 5/2017 | Kulas | |
| 9,906,829 | B2 * | 2/2018 | Kulas | H04N 21/47 |
| 10,003,781 | B2 | 6/2018 | Kulas | |

| | | | | |
|---|---|---|---|---|
| 10,187,688 | B2 * | 1/2019 | Kulas | H04N 21/47 |
| 10,575,044 | B2 * | 2/2020 | Kulas | H04N 21/4312 |
| 10,979,760 | B2 * | 4/2021 | Kulas | H04N 21/4312 |
| 11,678,008 | B2 * | 6/2023 | Kulas | H04N 21/4722 725/44 |
| 11,997,345 | B2 * | 5/2024 | Kulas | H04N 21/4314 |
| 2002/0026343 | A1 * | 2/2002 | Duenke | G06Q 30/0283 705/400 |
| 2002/0120935 | A1 * | 8/2002 | Huber | H04N 21/812 348/E7.071 |
| 2004/0098754 | A1 | 5/2004 | Vella et al. | |
| 2004/0107439 | A1 * | 6/2004 | Hassell | H04N 21/4312 725/51 |
| 2004/0143789 | A1 * | 7/2004 | Chung | G11B 27/105 715/255 |
| 2004/0189868 | A1 | 9/2004 | Molaro et al. | |
| 2005/0018045 | A1 * | 1/2005 | Thomas | G06V 10/147 348/E5.022 |
| 2005/0086690 | A1 * | 4/2005 | Gilfix | H04N 21/812 348/E5.103 |
| 2005/0132420 | A1 * | 6/2005 | Howard | G06F 3/017 348/E5.103 |
| 2005/0234958 | A1 | 10/2005 | Sipusic et al. | |
| 2005/0262542 | A1 | 11/2005 | DeWeese et al. | |
| 2006/0080337 | A1 * | 4/2006 | Mita | G06F 16/51 707/E17.031 |
| 2006/0218618 | A1 * | 9/2006 | Lorkovic | H04N 21/812 348/E7.071 |
| 2007/0079326 | A1 * | 4/2007 | Datta | G06Q 30/0261 725/23 |
| 2008/0008439 | A1 * | 1/2008 | Liu | H04N 21/4781 386/290 |
| 2008/0031590 | A1 | 2/2008 | Kulas | |
| 2008/0034295 | A1 * | 2/2008 | Kulas | G11B 27/005 386/E9.04 |
| 2008/0098425 | A1 * | 4/2008 | Welch | H04N 21/478 725/37 |
| 2008/0140523 | A1 * | 6/2008 | Mahoney | G11B 27/105 705/26.1 |
| 2008/0184121 | A1 | 7/2008 | Kulas | |
| 2008/0285940 | A1 * | 11/2008 | Kulas | H04N 21/4858 386/353 |
| 2008/0291272 | A1 * | 11/2008 | Krahnstoever | G06T 7/246 348/E5.025 |
| 2009/0019487 | A1 * | 1/2009 | Kulas | H04N 21/4722 725/41 |
| 2009/0019491 | A1 * | 1/2009 | Kulas | H04N 21/440272 725/44 |
| 2009/0024927 | A1 * | 1/2009 | Schrock | H04L 67/306 715/722 |
| 2009/0210778 | A1 * | 8/2009 | Kulas | H04N 21/4788 715/201 |
| 2017/0243618 | A1 | 8/2017 | Kulas | |
| 2018/0192120 | A1 | 7/2018 | Kulas | |
| 2021/0235151 | A1 * | 7/2021 | Kulas | H04N 21/4314 |
| 2022/0036926 | A1 * | 2/2022 | Kulas | G11B 27/3027 |
| 2023/0164382 | A1 * | 5/2023 | Kulas | H04N 21/4312 725/44 |

OTHER PUBLICATIONS

Third party, Alleged invalidity claim chart for U.S. Pat. No. 9,906,829 (recv'd Nov. 2022).
U.S. Appl. No. 11/499,315, filed Aug. 4, 2006.
U.S. Appl. No. 11/669,901, filed Jan. 31, 2007.

* cited by examiner

MULTIPLE VIDEO TAGS IN A VIDEO SCENE

RELATED APPLICATIONS

This application is a continuation of U.S. patent application Ser. No. 18/094,730 filed on Jan. 19, 2023, entitled "MOVING VIDEO TAGS," which is a continuation of U.S. patent application Ser. No. 17/229,240 filed on Apr. 13, 2021, entitled "MOVING VIDEO TAGS," which is a continuation of U.S. patent application Ser. No. 16/799,575 filed on Feb. 24, 2020, entitled "MOVING VIDEO TAGS," now U.S. Pat. No. 10,979,760, which is a continuation of U.S. patent application Ser. No. 16/253,597 filed on Jan. 22, 2019, entitled "MOVING VIDEO TAGS," now U.S. Pat. No. 10,575,044, which is a continuation of U.S. patent application Ser. No. 15/907,095, filed on Feb. 27, 2018, entitled "MOVING VIDEO TAGS," now U.S. Pat. No. 10,187,688, which is a continuation of U.S. patent application Ser. No. 15/269,701, flied on Sep. 19, 2016, entitled "MOVING VIDEO TAGS," now U.S. Pat. No. 9,906,829, which is a continuation of U.S. patent application Ser. No. 12/172,185, filed on Jul. 11, 2008, entitled "MOVING VIDEO TAGS OUTSIDE OF A VIDEO AREA TO CRE-ATE A MENU SYSTEM," now U.S. Pat. No. 9,451,195, which claims priority to U.S. Provisional Patent Application No. 60/949,505, filed on Jul. 12, 2007, entitled "VIDEO TAGS OUTSIDE OF VIDEO AREA." The entire disclosures of all of the foregoing patent applications are hereby incorporated by reference herein.

This application is related to U.S. patent application Ser. No. 11/499,315, filed on Aug. 4, 2006, entitled "DISPLAY-ING TAGS ASSOCIATED WITH ITEMS IN A VIDEO PLAYBACK," now U.S. Pat. No. 10,003,781, the entire disclosure of which is hereby incorporated by reference herein.

This application is also related to U.S. patent application Ser. No. 11/669,901 filed on Jan. 31, 2007 entitled "AUTHORING TOOL FOR PROVIDING TAGS ASSOCI-ATED WITH ITEMS IN A VIDEO PLAYBACK," now U.S. Pat. No. 8,656,282, issued on Feb. 18, 2014, the entire disclosure of which is hereby incorporated by reference herein

SUMMARY OF EMBODIMENTS OF THE INVENTION

Tags in a video area are established by displaying the tags with a visual association to an item in the video. Thereafter, the tags move to a tag menu area that is outside of the video area. Tags are selectable, such as by clicking on the tag, to cause additional actions such as displaying a web page related to the tag. Tags move and disappear/appear in conjunction with the video as the video action progresses. In one embodiment, the tag menu area is obtained when a video with a first aspect ratio is displayed in a display area that has a different aspect ratio. The difference in aspect ratios leaves a portion in the display area that is not used for the video that can be used for the tag menu area.

DETAILED DESCRIPTION OF EMBODIMENTS OF THE INVENTION

One approach to product placement includes providing additional information such as text, graphics or other information in association with an item in a video scene. The information can be in the form of a "tag" that can be shown in a tag mode that is selectable by a viewer by using a control such as a television remote control unit. Such an approach is described, for example, in the co-pending patent application referenced above.

Tags can provide information about items, and the tags may be visible during video playback, during a broadcast video program, during video play on a computer platform, or via other types of video playing or presentation. Tags can identify a brand name, item name, location where an item can be purchased, and/or additional information about the item. Various features presented herein allow creation or authoring of the tags or other types of information so that tags can be inserted into, or defined in or with, video or other visual content.

A typical form of video playback for a user or viewer can include a Digital Video Disc (DVD) player. Further, a multi-angle feature of the player may be used to allow a viewer to switch between tagged and non-tagged playback. In normal or non-tagged playback, tags may not be visible, and an original video sequence (e.g., a television program, movie, etc.) can be played in typical fashion. When a viewer presses a button, a new video sequence that includes tags may be selected. The new video sequence can be synchronized to an original video sequence so that the effect can be that tags appear over continuous action of the original video sequence. The viewer can turn off the tags by selecting an original sequence, for example. Other forms or mechanisms for playback can be used to achieve the same or a similar effect.

Tags can be organized and displayed according to categories, such as "design," "gadgets," "scene," or any other suitable category. For example, the design category can display tags that deal with fashion, interior/exterior decorating, architecture, art, and similar types of items. The gadgets category can include electronics, appliances, cars, etc., and the scene category can provide information on colors, furniture, plants, locations, climate, or the like. Other categories can be created, as desired, and tags of a specific category can be selected for independent display. Alternatively, categories can be combined to display tags from multiple categories on a same display.

Figure 1:
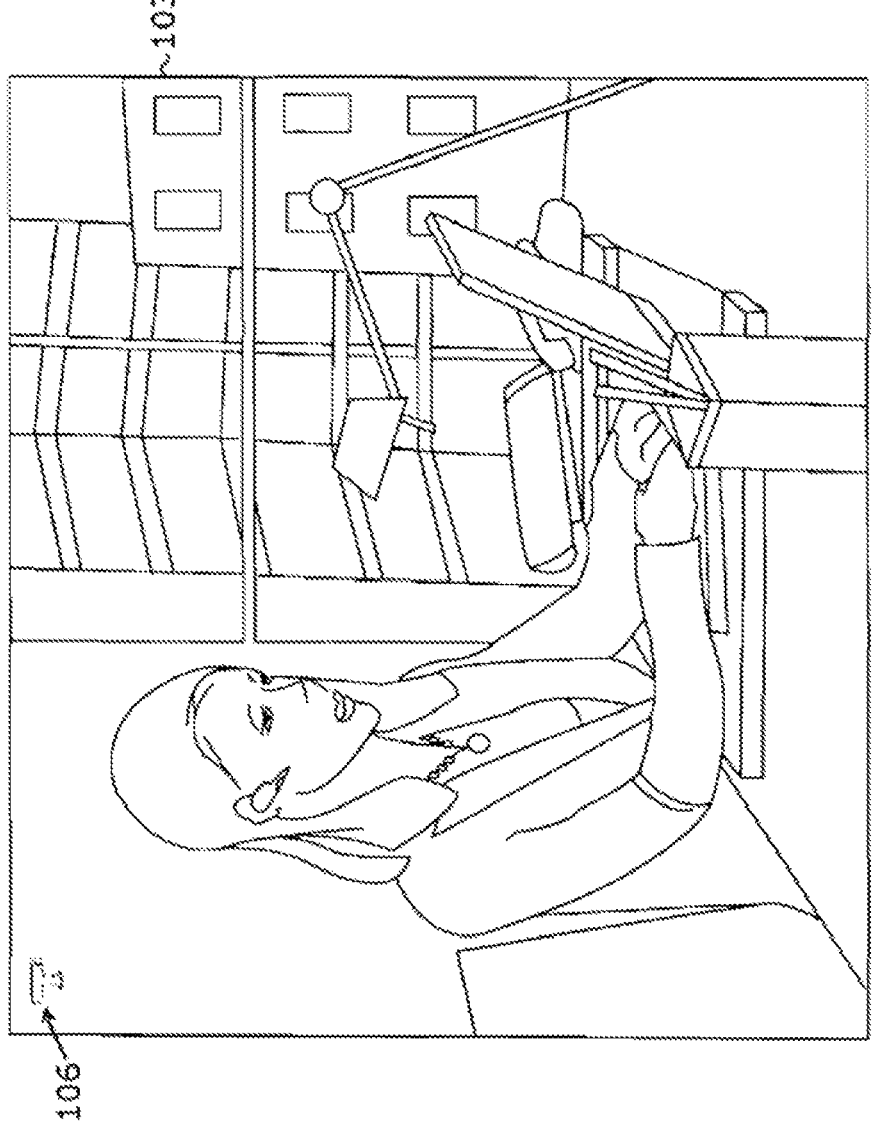
FIG. 1 shows an example of a video display including an image frame.

FIG. 1 illustrates a video display without tags. In FIG. 1, display 108 includes a typical image. In this case the image is of a woman in an office typing at a laptop at her desk while she is also talking on a wireless phone. The video plays with animation and sounds as is known in the art although only a single image frame from the video is shown in FIG. 1. Although embodiments of the invention are discussed primarily with respect to video presentations, any type of visual presentation can be adapted for use with the present invention. For example, animations, movies, pre-stored files, slide shows, Flash™ animation, etc. can be used with features of the invention.

Any type of playback device (e.g., computer system, set-top box, DVD player, etc.), image format (Motion Picture Experts Group (MPEG), Quicktime™, audio-visual interleave (AVI), Joint Photographic Experts Group (JPEG), motion JPEG, etc.), display method or device (cathode ray tube, plasma display, liquid crystal display (LCD), light emitting diode (LED) display, organic light emitting display (OLED), electroluminescent, etc.). Any suitable source can be used to obtain playback content such as a DVD, HD DVD, Blu-Ray™ DVD, hard disk drive, video compact disk (CD), fiber optic link, cable connection, radio-frequency transmission, network connection, etc. In general, the audio/visual content, display and playback hardware, content format, delivery mechanism and other components and properties of the system can vary, as desired, and any suitable items and characteristics can be used.

Figure 2:
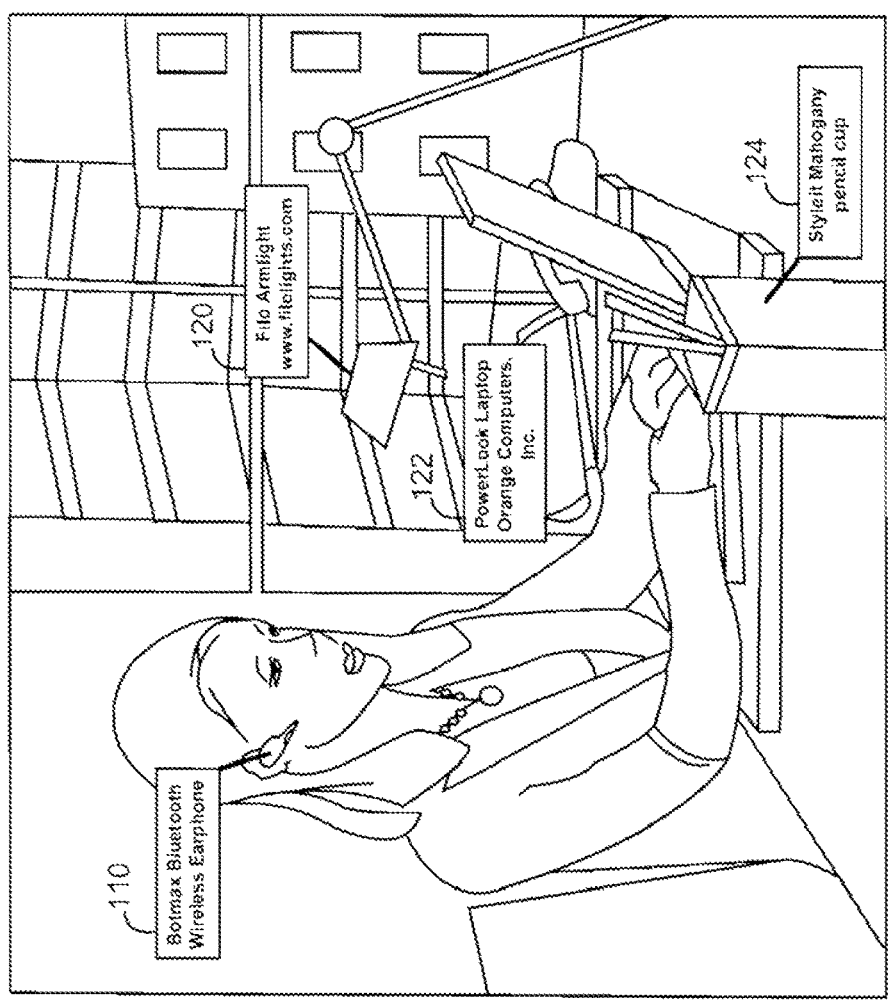
FIG. 2 shows the frame of FIG. 1 including tags in a Gadget category.

FIG. 2 shows the display of FIG. 1 with tags added to the image. In a preferred embodiment, a user can select whether tags are displayed or not by using a user input device. For example, if the user is watching a video played back on a television via a DVD player or a cable box then the user can press a button on a remote control device to cause the tags to be displayed on a currently running video. Similarly, the user can deselect, or turn off, the tag display by depressing the same or a different button. If the user is watching video playback on a computer system a keyboard keypress can cause the tags to turn on or off. Or a mouse selection of an on-screen button or command can be used. Other embodiments can use any other suitable control for invoking tag displays. Displaying of tags can be automated as where a user decides to watch a show without tags for a first time and then automatically replay the show with tags a second time.

In FIG. 2, each tag is shown with a text box and lead line. The text box includes information relevant to an item that is pointed at by the lead line. For example, tag 110 states "Botmax Bluetooth Wireless Earphone" with a lead line pointing to the earphone that is in the ear of the woman who is the subject of the scene. Thus, a viewer who is interested in such things can obtain enough information from the tag to find a seller of the earphone. Or the viewer can do an online search for the earphone by manufacturer and/or model name and can obtain more information about the earphone as research prior to making a purchase.

Other tags such as 120, 122 and 124 provide information about other items in the frame. Tag 120 states "Filo Armlight" to point out the manufacturer ("Filo") and model ("Armlight") and website (www.filolights.com) relating to the light to which tag 120 is connected via its lead line. Tags can include any type of interesting or useful information about an item or about other characteristics of the image frame or video scene to which the image frame belongs.

Tag 122 points to the laptop on which the woman is typing and states "PowerLook Laptop 1 Orange Computers, Inc." This shows the model and manufacturer of the laptop. Tag 124 points to the pencil holder and reads "StyleIt Mahogany pencil cup." Note that more, less or different information can be included in each tag, as desired, by the company that is managing the tag advertising ("tagvertising") of the particular video content.

Figure 3:
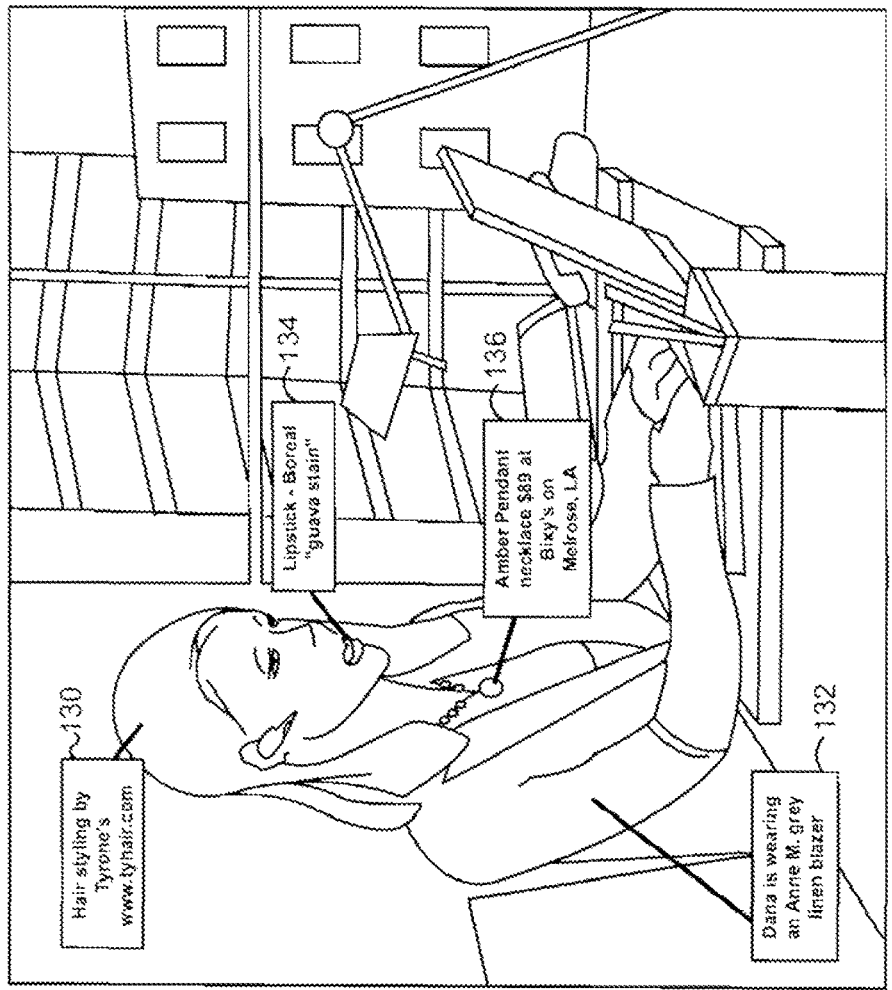
FIG. 3 shows the frame of FIG. 1 including tags in a Style category.

FIG. 3 shows additional types of items that can be tagged. In FIG. 2, the tagged items are in a "gadget" category of electronic items or physical useful objects. FIG. 3 shows a second category of "style." In this category, items such as apparel, fashion accessories, jewelry, hairstyles, makeup colors, interior decorating colors and designs, fabric types, architecture, etc. are described by information provided by tags.

Tag 130 relates to the woman's hair styling and states the hairdresser's name and website for information about the salon. Tag 132 describes the jacket designer and fabric. Tag 134 shows a cosmetics manufacturer and color of the lipstick that the woman is wearing. Tag 136 describes the material, style, price and reseller relating to the necklace.

Figure 4:
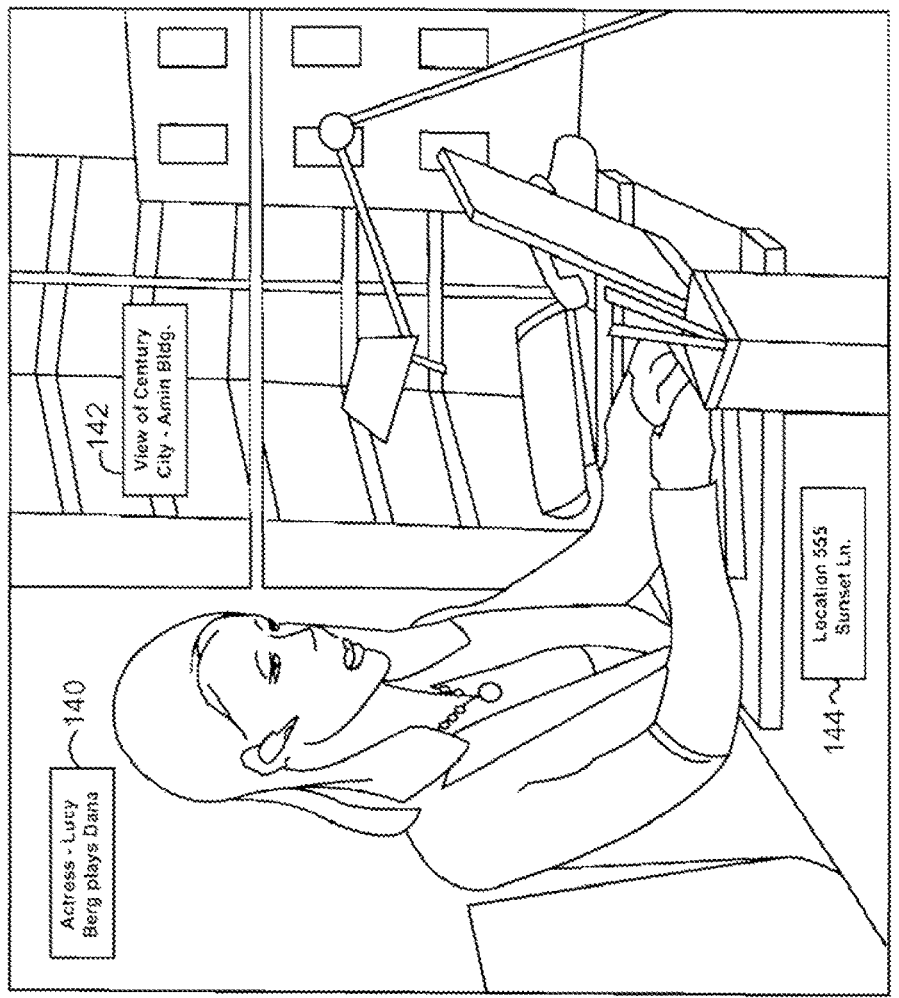
FIG. 4 shows the frame of FIG. 1 including tags in a Scene category.

In FIG. 4, another category of tags relating to the "scene" is displayed. Tag 140 describes the actress and character being played, tag 142 describes what is being seen through the window, and tag 144 shows the location of where this scene was shot. Other information relating to the scene can be provided such as time of day, type of lighting used to light the set, type of camera and camera setting used to capture the image, the name of the director, screenwriter, etc.

Tag designs can vary and can use any suitable design property. Usually it is desirable to have the tags be legible and convey a desired amount of information while at the same time being as unobtrusive as possible so that viewing of the basic video content is still possible. Different graphics approaches such as using colors that are compatible with the scene yet provide sufficient contrast, using transparent or semi-transparent windows, etc. can be employed. Tag placement can be chosen so that the tag overlays areas of the video that are less important to viewing. For example, a blank wall could be a good placement of a tag while an area over a character's face would usually not be a good placement.

Tag shape, color, position, animation and size are some of the tag characteristics that can be modified. Many different factors can affect these tag characteristics. If a specific factor, such as aesthetics, is given priority then a graphic artist or scene coordinator can be used to match the look and behavior of tags to a theme of a scene or overall presentation. For example, where a scary movie is tagged, the tag design can be in darker colors with borders having cobwebs, blood, ritual symbols, etc. For a science fiction episode, the tags can be made to look futuristic.

If an advertising factor is given priority then tags from a preferred sponsor (e.g., someone who is paying more for advertising) can be presented in bolder text, brighter colors, made larger or made to overlap on top of other tags, etc.

In general, any of the tag characteristics can be modified in accordance with one or more factors.

As the scene changes, such as when characters or objects move through or within a scene, when the camera changes angles, when there is a cut to another scene, etc., tags can also change according to a tag behavior. Different tag behaviors can be used to achieve objectives of conveying information associated with an item while still allowing viewing of the video. One behavior is to minimize the movement of a tag's text while still allowing the tag to "point" to the item. This can be accomplished by keeping the tag's text stationary with one end of the lead line connecting to the text box and the other end following a moving item to which the text relates.

Another tag behavior is to shrink or enlarge a tag's text box according to the relative size of the item associated with the tag. For example, if an item is in the foreground then the tag's text area can be larger. As the item moves farther from the camera and becomes smaller, then the tag can become smaller and can eventually be removed from the screen. The manner of shrinking the text area can include making the actual text smaller, removing text from the display while retaining other text, replacing the text with alternative text, etc. Tags may be displayed for items that are not visible in the same frame as the tag.

Although tags are shown having a lead line that connects the tag text area with an associated item, other tag designs are possible. For example, a line may end in an arrowhead to "point" in the general direction of an associated item. A cartoon bubble with an angled portion that points to an item can be used. If the tag is placed on or near its associated item then a lead line or other directional indicator may not be necessary. In other words, the placement of the tag or text can be an indicator of the associated item. Any suitable, desired or effective type of indicator for associating tag information with an item may be employed. Many other variations of tag characteristics or behavior are possible.

Figures 5, 6, 7, 8:
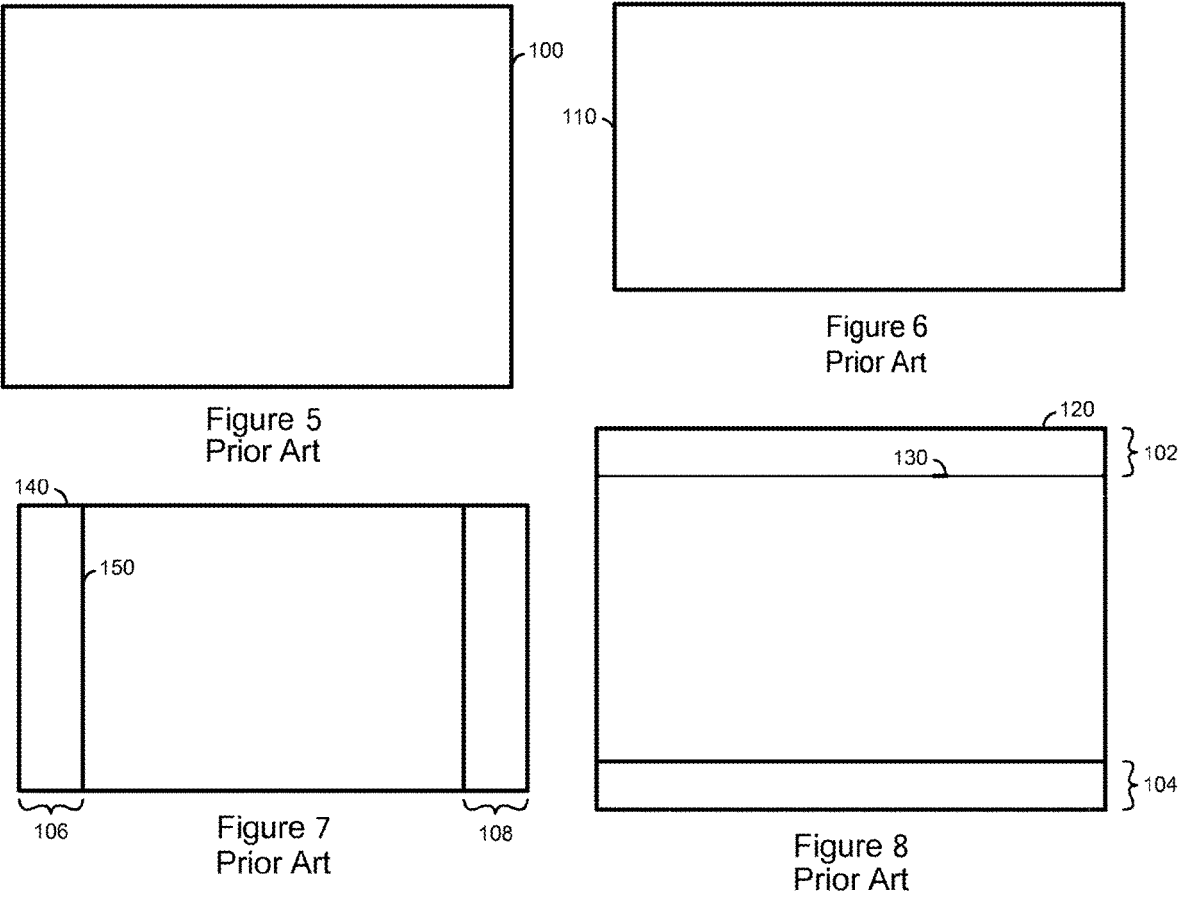
FIG. 5 is a first illustration of a prior art approach to displaying video.
FIG. 6 is a second illustration of a prior art approach to displaying video.
FIG. 7 is a third illustration of a prior art approach to displaying video.
FIG. 8 is a fourth illustration of a prior art approach to displaying video.

FIGS. 5-8 illustrate prior art approaches to placing a video of a first aspect ratio into a display area of a second aspect ratio. In FIG. 5, video area 100 is a 4:3 aspect ratio such as is commonly used in standard definition (SD) video play-back. The ratio 4:3 corresponds to the width divided by the height of the video area. FIG. 6 shows video area 110 which is representative of a 16:9 aspect ratio that is commonly used in high-definition (HD) video formats. Typically, the SD and HD formats are best displayed in a display area that matches the native dimensions of the video aspect ratio. In such cases the full display area (e.g., a television or display screen, predetermined area such as on a web page or computer program, etc.) is filled completely with the video area.

However, in many cases it is undesirable or impossible to change the video display area to exactly match the video aspect ratio. For example, a user may have an SD television and may wish to view an HD program. In such a case, FIG. 7 illustrates a "letterbox" type of solution to the problem. In FIG. 7, an HD display area 120 accommodates HD video program 130 by scaling and vertically centering the HD video area so that it is centered within the SD screen area. This leaves blank or unused areas 102 and 104 at the top and bottom, respectively, of display area 120. These blank areas are typically black or grey and are not used to display video or any other information.

Similarly, FIG. 8 illustrates an example where SD video program 150 is displayed within HD display area 140. This leaves blank "pillars" 106 and 108 on the left and right sides, respectively, of the display area.

Figures 9, 10:
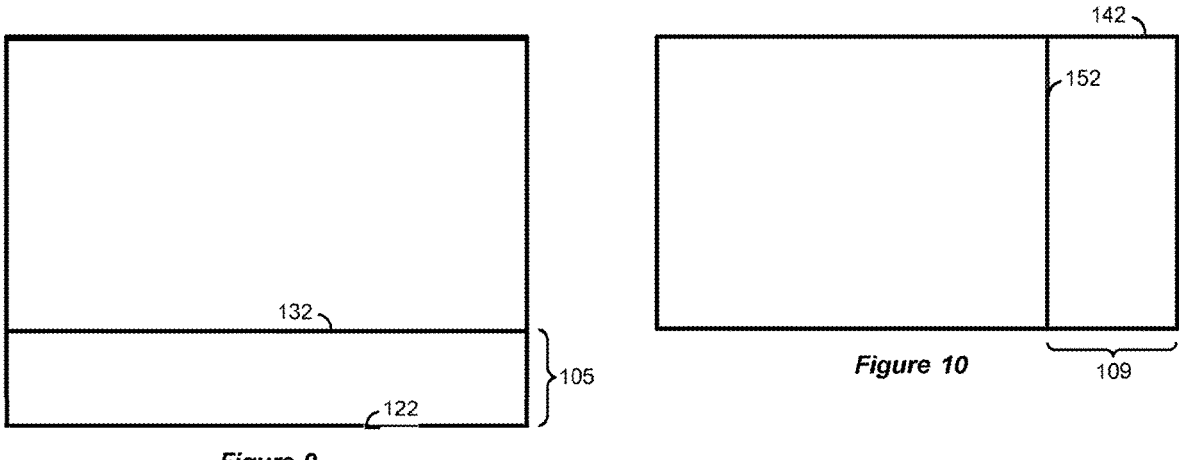
FIG. 9 shows high definition format video displayed within a standard definition area.
FIG. 10 shows a standard definition format video displayed within a high-definition format video.

FIG. 9 shows an approach according to an embodiment of the present invention where HD format video program 132 is displayed within SD display area 122 so that a lower blank area 105 is maximized. This blank area is advantageously used for display of enhanced or auxiliary information associated with the video program. For example, tags can be displayed in the video and in the blank area as described, below. Similarly, FIG. 10 shows an SD format video 152 displayed within HD area 142 so that a blank area 109 is maximized to the right of the video. This blank area can similarly be used for additional information related to the video or for other purposes. Naturally, the blank areas can be positioned at the top and/or left sides of FIGS. 9 and 10, respectively. The display area can be on a physical display screen, on a portion of a computer display or web page, or the display area can be defined by other means.

Figure 11:
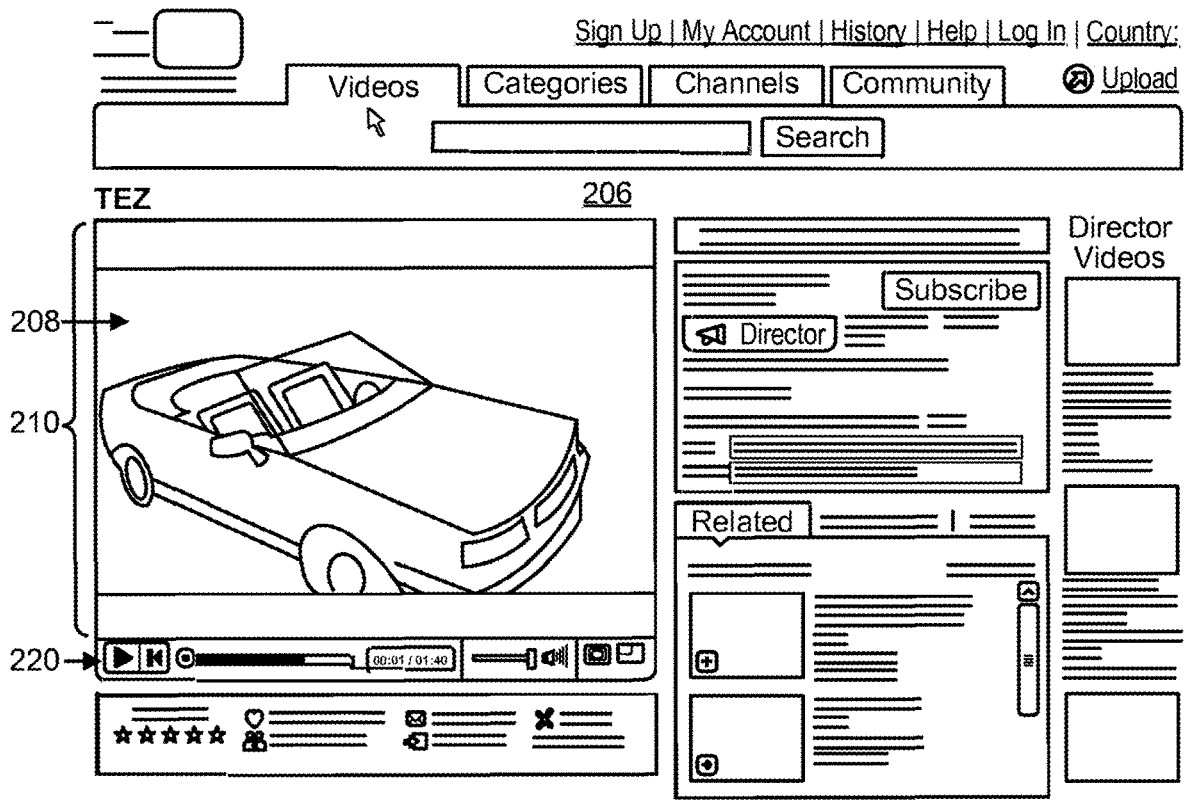
FIG. 11 shows a prior art approach where standard definition video is shown in a standard definition display area.

FIGS. 11-16 illustrate an HD format video displayed within an SD display area on a web page. FIG. 11 shows a prior art approach where SD video 208 is shown in SD display area 210 of web page 206. The web page provides video transport controls at 220 for performing standard control over the video playback such as start, stop, pause, skip to start, move to position, and volume control. Although specific controls are shown, in general any type and design of video playback controls can be provided.

Figure 12:
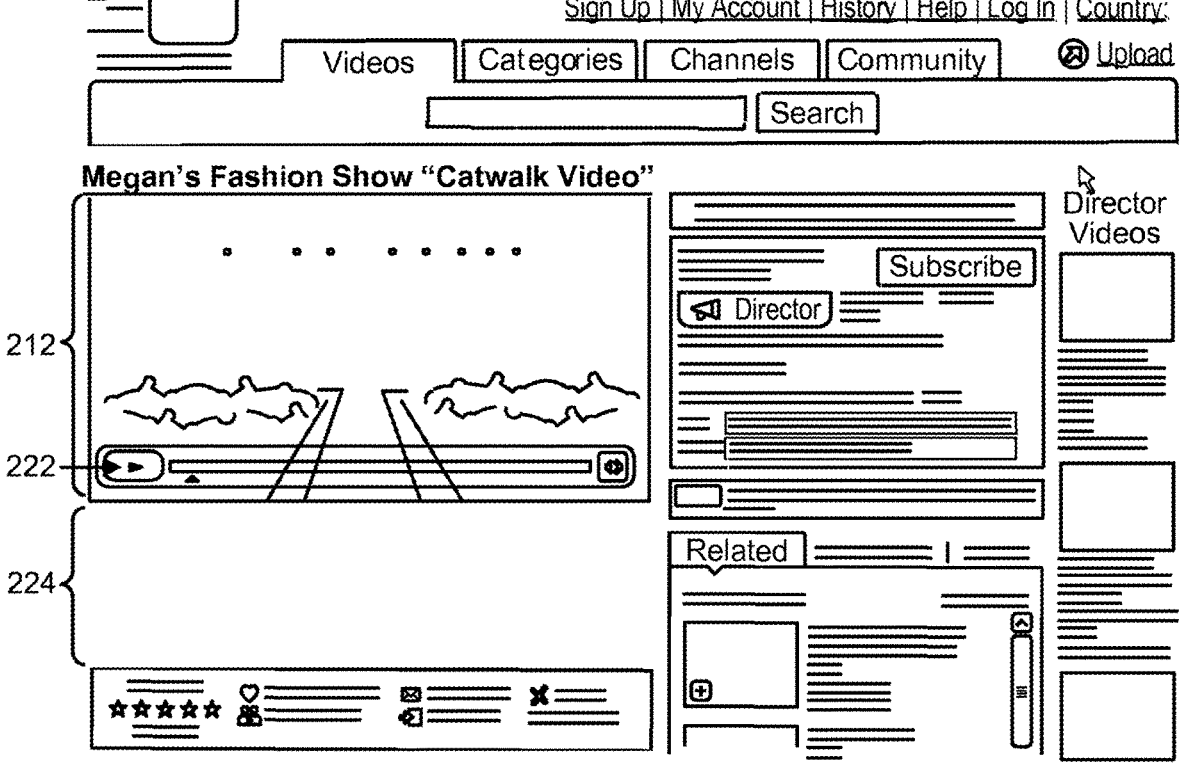
FIG. 12 shows high-definition video in a standard-definition area.

FIG. 12 shows HD format video 212 fit into the upper portion of the SD space on the same web page. This creates blank space 224 which will be used for tag menu items as described below. Transport controls 222 are overlayed onto the video area. However, other embodiments need not overlay the transport controls but may place them in any desirable position, such as in the position of FIG. 11, to the top, left or right sides, not display them at all, etc.

Figures 13, 14:
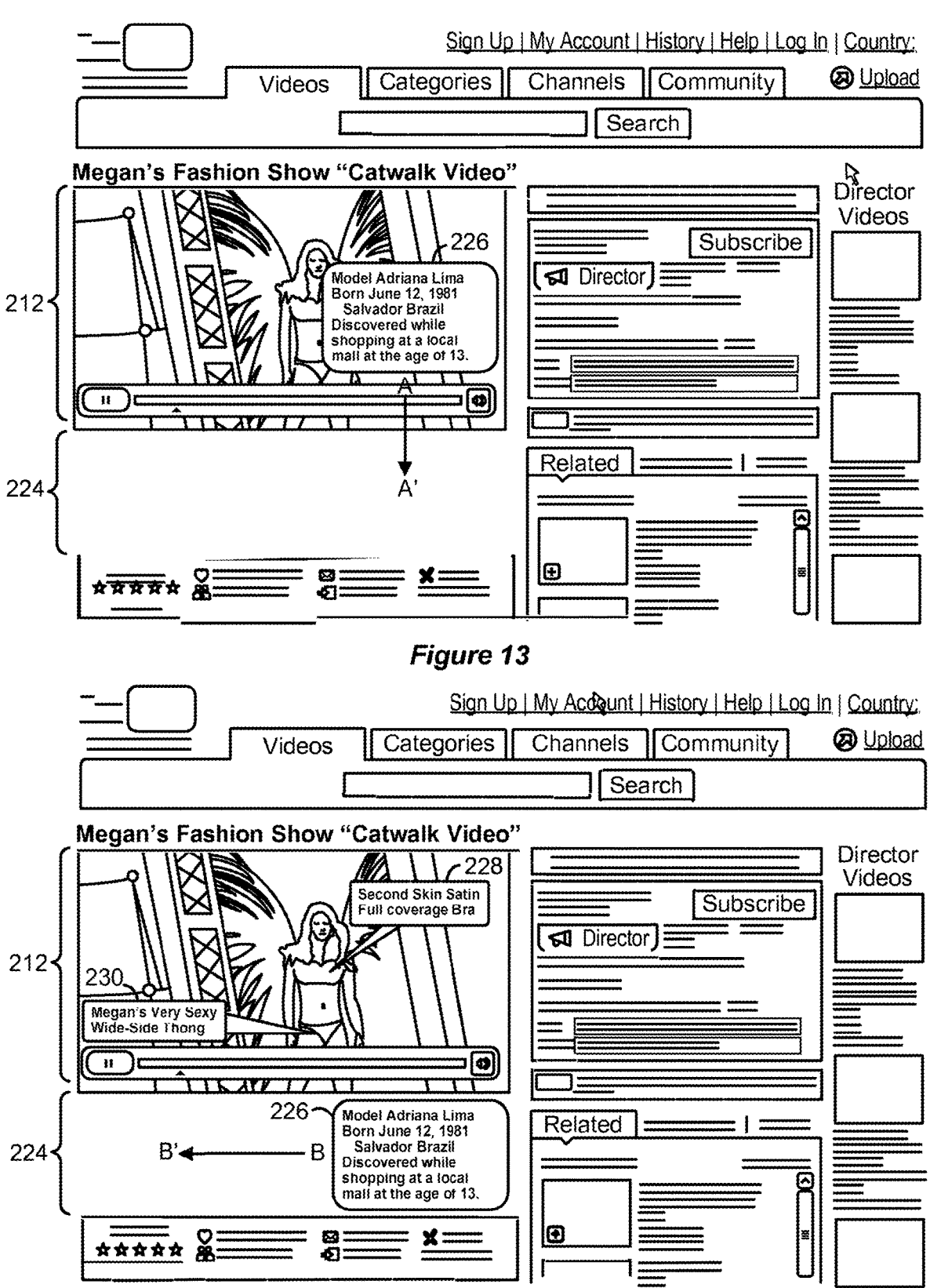
FIG. 13 illustrates video including a tag.
FIG. 14 shows a video after tag movement.

FIG. 13 illustrates video area 212 after the video has started playing back. A video bubble or tag 226 is shown that provides information about the model in the scene. Although specific video subject matter and tag text is shown it should be apparent that the video contents and tag text, design and other tag characteristics can be changed, as desired. As the video plays, the tag moves in the direction A to A' to reside in tag menu area 224.

FIG. 14 shows the video display a few seconds later when tag 226 has moved into the tag menu area 224. Additional tags 228 and 230 have appeared in video area 212 to describe garments that the model is wearing. Visual pointers from tags 228 and 230 serve to associate each tag with its respective garment item. Tag 226 will next move along the direction B to B' while tags 228 and 230 will each move to the tag menu area.

Figures 15, 16:
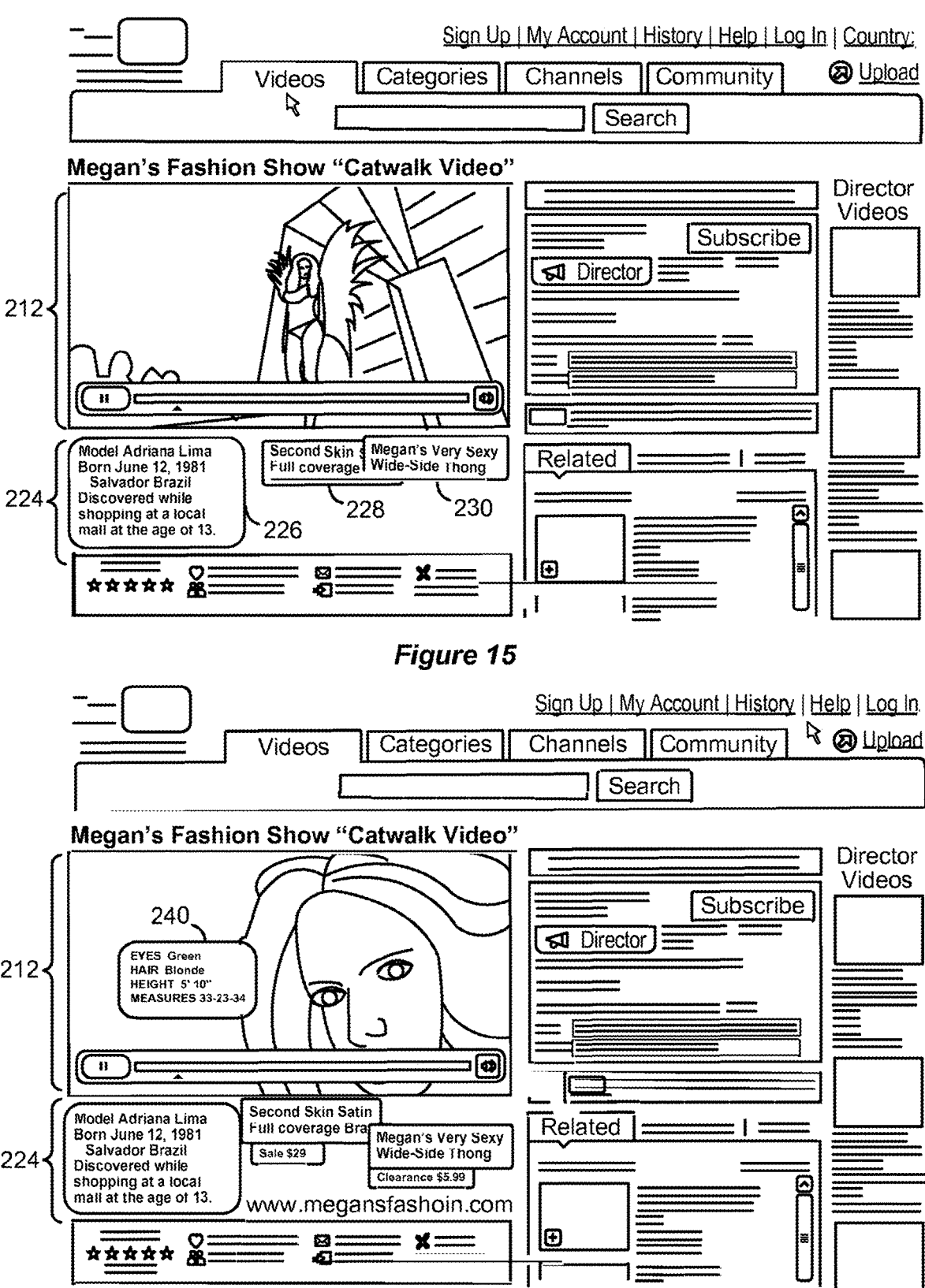
FIG. 15 shows a video after additional tag movement.
FIG. 16 shows tags reaching their final positions.

FIG. 15 shows tag 226 positioned at the left side of tag menu area 224 while tags 228 and 230 have moved to the tag menu area (and are still in motion moving sideways to create more separation between them). FIG. 16 illustrates a point in time where the tags have reached their final positions and additional information, such as price information and website address information is also displayed into the tag menu area. A new tag 240 has appeared to provide more information about the model. In this manner, any number and type of tag can be presented in association with an item in the video (or in the abstract) and can then be moved to the tag menu area. Each tag can be "clickable" so that, upon selection by a user, additional information related to the tag, such as a web page, is displayed. Other functionality may be provided to the tags-such as allowing a tag to expand to provide additional information, opening an adjacent window or frame next to the video playback to provide additional information or functionality, etc. Although specific content has been used in this example, it should be apparent that any other content can be used for the video and/or the tags.

Many other types of hardware and software platforms can be used to implement the functionality described herein. For example, a video player can be included in a portable device such as a laptop, PDA, cell phone, game console, e-mail device, etc. The tag data can reside on a storage device, server, or other device that is accessed over another network.

In general, the functions described can be performed by any one or more devices, processes, subsystems, or components, at the same or different times, executing at one or more locations.

Accordingly, particular embodiments can provide for computer playback of video that supports automatically capturing of screen snapshots, in the accommodation of tag information outside of a video play area. Further, while particular examples have been described herein, other structures, arrangements, and/or approaches can be utilized in particular embodiments.

Any suitable programming language can be used to implement features of the present invention including, e.g., C, C++, Java, PUI, assembly language, etc. Different programming techniques can be employed such as procedural or object oriented. The routines can execute on a single processing device or multiple processors. The order of operations described herein can be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," "in a particular embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Further, distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The invention claimed is:

1. A method comprising:

causing a display device to display a video scene, the video scene including a plurality of items depicted in the video scene;

causing the display device to display, simultaneously with the video scene, a first tag in a first position in the video scene, the first tag being associated with one of the items in the video scene;

causing the display device to display, simultaneously with the video scene and the first tag, a second tag in a second position in the video scene, the second tag being associated with one of the items in the video scene, the second tag appearing distinct and separated away from its associated item in the video scene, wherein the second tag includes text information describing its associated item in the video scene, the second position being distinct from the first position; and causing the display device to display a visually perceptible indicator extending between a proximity of the second position and a proximity of the position in the video scene of the item associated with the second tag, wherein the visually perceptible indicator is characterized by a length and an angular orientation, wherein the length is determined by a distance between the second tag and its associated item in the video scene, wherein the angular orientation is determined by the second position and the position in the video scene of the item associated with the second tag, and wherein one or more of the length and the angular orientation changes as the second tag and its associated item move relative to each other.

2. A method according to claim 1, wherein the visually perceptible indicator is a line.

3. A method according to claim 1, wherein the visually perceptible indicator comprises two lines.

4. A method according to claim 1, wherein the visually perceptible indicator has a triangular shape.

5. A method according to claim 1, wherein the first position is static during the video scene, and wherein the second position is static during the video scene.

6. A method according to claim 1, wherein the item associated with the first tag undergoes motion within the video scene.

7. A method according to claim 1, wherein the item associated with the second tag undergoes motion within the video scene.

8. A method according to claim 7, wherein the second position changes as the item associated with the second tag undergoes motion within the video scene.

9. A method according to claim 1, wherein the first tag is surrounded by a visually perceptible border defining a first tag area.

10. A method according to claim 1, wherein the second tag is surrounded by a visually perceptible border defining a second tag area.

11. A method according to claim 1, wherein the text information in the second tag is a brand name of or purchasing information for the item in the video scene.

12. A method according to claim 1, wherein each of the first tag and the second tag belongs to a tag category, and wherein each tag category is one of gadgets, scene, style, or design.

13. An apparatus for use with a video display device, the apparatus comprising:

a hardware processor; and a memory storing instructions that configure the hardware processor to:

cause the display device to display a video scene, the video scene including a plurality of items depicted in the video scene;

cause the display device to display, simultaneously with the video scene, a first tag in a first position in the video scene, the first tag being associated with one of the items in the video scene;

cause the display device to display, simultaneously with the video scene and the first tag, a second tag in a second position in the video scene, the second tag being associated with one of the items in the video scene, the second tag appearing distinct and separated away from its associated item in the video scene, wherein the second tag includes text information describing its associated item in the video scene, the second position being distinct from the first position; and cause the display device to display a visually perceptible indicator extending between a proximity of the second position and a proximity of the position in the video scene of the item associated with the second tag, wherein the visually perceptible indicator is characterized by a length and an angular orientation, wherein the length is determined by a distance between the second tag and its associated item in the video scene, wherein the angular orientation is determined by the second position and the position in the video scene of the item associated with the second tag, and wherein one or more of the length and the angular orientation changes as the second tag and its associated item move relative to each other.

14. An apparatus according to claim 13, wherein the item associated with the first tag undergoes motion within the video scene, wherein the item associated with the second tag undergoes motion within the video scene, and wherein the second position changes as the item associated with the second tag undergoes motion within the video scene.

15. A non-transitory computer-readable medium having instructions stored thereon, the instructions comprising:

instructions to cause a display device to display a video scene, the video scene including a plurality of items depicted in the video scene;

instructions to cause the display device to display, simultaneously with the video scene, a first tag in a first position in the video scene, the first tag being associated with one of the items in the video scene;

instructions to cause the display device to display, simultaneously with the video scene and the first tag, a second tag in a second position in the video scene, the second tag being associated with one of the items in the video scene, the second tag appearing distinct and separated away from its associated item in the video scene, wherein the second tag includes text information describing its associated item in the video scene, the second position being distinct from the first position; and instructions to cause the display device to display a visually perceptible indicator extending between a proximity of the second position and a proximity of the position in the video scene of the item associated with the second tag, wherein the visually perceptible indicator is characterized by a length and an angular orientation, wherein the length is determined by a distance between the second tag and its associated item in the video scene, wherein the angular orientation is determined by the second position and the position in the video scene of the item associated with the second tag, and wherein one or more of the length and the angular orientation changes as the second tag and its associated item move relative to each other.

16. A non-transitory computer-readable medium according to claim 15, wherein the item associated with the first tag undergoes motion within the video scene, wherein the item associated with the second tag undergoes motion within the video scene, and wherein the second position changes as the item associated with the second tag undergoes motion within the video scene.

\* \* \* \* \*